(12) United States Patent
Wakahara (10) Patent No.: US 8,248,730 B2
(45) Date of Patent: Aug. 21, 2012

(54) MAGNETIC HEAD SLIDER LOCKING APPARATUS

(75) Inventor: Masahito Wakahara, Kyoto-fu (JP)

(73) Assignee: Suncall Corporation, Kyoto-Fu (JP)

( * ) Notice: Subject to any disclaimer, the term of this patent is extended or adjusted under 35 U.S.C. 154(b) by 0 days.

(21) Appl. No.: 13/098,075

(22) Filed: Apr. 29, 2011

(65) Prior Publication Data

US 2011/0267719 A1 Nov. 3, 2011

(30) Foreign Application Priority Data

Apr. 30, 2010 (JP) ................................ 2010-105171

(51) Int. Cl.
*G11B 21/26* (2006.01)
(52) U.S. Cl. .................................. 360/245.3; 360/245.7
(58) Field of Classification Search .................. 360/245, 360/245.2, 245.3, 256.5
See application file for complete search history.

(56) References Cited

U.S. PATENT DOCUMENTS

| | | | | |
|---|---|---|---|---|
| 6,549,375 | B1 * | 4/2003 | Crane et al. ................ | 360/245.3 |
| 7,016,267 | B2 * | 3/2006 | Suzuki ....................... | 369/13.17 |
| 7,889,460 | B2 * | 2/2011 | Hanya et al. ............... | 360/245.3 |
| 2006/0236527 | A1 * | 10/2006 | Davis et al. ................ | 29/603.12 |
| 2011/0007424 | A1 * | 1/2011 | Wakahara .................. | 360/244.2 |
| 2011/0205670 | A1 * | 8/2011 | Wakahara ................... | 360/256 |
| 2011/0267719 | A1 * | 11/2011 | Wakahara ................... | 360/256.5 |

FOREIGN PATENT DOCUMENTS

JP 2009-245571 A 10/2009

* cited by examiner

*Primary Examiner* — Brian Miller
(74) *Attorney, Agent, or Firm* — Sterne, Kessler, Goldstein & Fox PLLC (57) ABSTRACT

The magnetic head slider locking apparatus according to the present invention includes a fixed portion, a movable portion and paired right and left spring portions. Upon transition from an initial posture to an elastically deformed posture, the movable portion is wholly moved toward the proximal side in the suspension longitudinal direction and, at the same time, the inner end of each of paired proximal-side engagement regions in the suspension width direction is moved toward the inner side in the suspension width direction, so that the distal end and the proximal end of each of the proximal-side extending regions are moved toward the inner side and the outer side in the suspension width direction, respectively, while the proximal-side extending regions are wholly moved toward the proximal side in the suspension longitudinal direction.

7 Claims, 9 Drawing Sheets

MAGNETIC HEAD SLIDER LOCKING APPARATUS

BACKGROUND OF THE INVENTION

1. Field of the Invention

The present invention relates to a magnetic head slider locking apparatus for detachably mounting to a magnetic head suspension a magnetic head slider, which reads and/or writes data from and to a recording medium such as a hard disk drive.

2. Related Art

It is preferable to conduct performance tests on reading properties and/or writing properties as well as levitation properties of a magnetic head slider for reading and/or writing data in accordance with a state of use of the magnetic head slider, that is, in a state where the magnetic head slider is mounted to a magnetic head suspension having a configuration identical with that of a magnetic head suspension to which the magnetic head slider should be mounted.

More specifically, an ordinary magnetic head suspension includes a supporting part that is connected directly or indirectly to an actuator such as a voice coil motor, a load bending part that is connected to the supporting part and generates a load to press a magnetic head slider toward a disk surface, a load beam part that is connected to the load bending part so as to transmit the load to the magnetic head slider, and a flexure part that has a head mount region to which the magnetic head slider is mounted and is supported by the load beam part and the supporting part.

Accordingly, in order to conduct performance tests of the magnetic head suspension in a state corresponding to the used condition thereof, it is necessary to conduct the performance tests in a state where the magnetic head slider is fixed to the head mount region by welding or the like.

However, upon conducting the performance tests in the state where the magnetic head slider is fixed to the head mount region, if the results of the tests on the magnetic head slider are defective, it is necessary to discard not only the magnetic head slider but also the magnetic head suspension to which the magnetic head slider has been fixed, resulting in an increase in cost.

In view of the above, there have been proposed slider support devices for performance tests, which are capable of detachably retaining the magnetic head slider in accordance with a state of use thereof (see, for example, Japanese Unexamined Patent Publication No. 2009-245571, hereinafter referred to as prior art document 1).

The slider support device is provided with, in place of the flexure part of the ordinary magnetic head suspension, a flexure part to which the magnetic head slider is detachably mounted.

More specifically, in the slider support device that is disclosed as an example in the prior art document 1, the flexure part has paired outriggers (arm regions) extending toward a distal side from both ends in a suspension width direction of a region that is overlapped with and connected to the load beam part, a distal-side connection region extending in the suspension width direction so as to connect distal ends of the paired outriggers, a head mount region extending from a center in the suspension width direction of the distal-side connection region toward a proximal side in a suspension longitudinal direction, paired right and left longitudinal direction accordion-like spring portions extending from the distal-side connection region toward the proximal end side in the suspension longitudinal direction so as to be arranged on both sides in the suspension width direction of the head mount region, and a proximal-side connection region extending in the suspension width direction so as to connect proximal ends of the paired longitudinal direction accordion-like spring portions.

The distal-side connection region is provided with a connecting terminal for signal transfer that is engaged with a distal-side end surface of the magnetic head suspension and is electrically connected to the magnetic head suspension. The connecting terminal prevents the magnetic head slider mounted on the head mount region from being shifted toward the distal side in the suspension longitudinal direction.

The paired longitudinal direction accordion-like spring portions are capable of expanding and contracting in the suspension longitudinal direction to generate a biasing force for pressing the proximal-side connection region toward a proximal-side end surface of the magnetic head suspension so that the magnetic head suspension is sandwiched by the connecting terminal and the proximal-side connection region in the suspension longitudinal direction.

The slider support device disclosed in the prior art document 1 is configured to retain the magnetic head slider on the head mount region with use of the elastic forces of the paired longitudinal direction accordion-like spring portions, without adopting substantially inseparable fixing means such as welding or adhesive joining.

The slider support device is useful in realizing the performance tests of the magnetic head slider in accordance with the state of use thereof, as well as enabling only the defective magnetic head slider to be discarded.

On the other hand, the slider support device has the following problems.

More specifically, the slider support device disclosed in the pair art document 1 generates the biasing force for sandwiching the magnetic head suspension in the suspension longitudinal direction by means of the paired longitudinal direction accordion-like spring portions, each of which includes convex portions and concave portions arranged alternately to each other in the suspension longitudinal direction.

In order to secure the elastic force sufficiently enough to retaining the magnetic head suspension with respect to the suspension longitudinal direction by such the accordion-like spring portions, it is necessary to provide each of the paired longitudinal direction accordion-like spring portions with a substantial number of sets of the convex portion and the concave portion.

In view of the above, in the slider support device disclosed in the prior art document 1, each of the paired longitudinal direction accordion-like spring portions includes three sets of the convex portion and the concave portion.

This requires high processing accuracy in forming the paired longitudinal direction accordion-like spring portions, which results in a remarkable increase in cost.

Moreover, apexes of the convex portions and the concave portions are locally and elastically deformed upon expansion and contraction of the paired longitudinal direction accordion-like spring portions. Therefore, the conventional configuration that secures the biasing force in the suspension longitudinal direction by means of the paired longitudinal direction accordion-like spring portions also has a problem on durability thereof.

Furthermore, in the slider support device disclosed in the prior art document 1, the proximal-side connection region includes a slider engagement portion and paired right and left jig engagement portions arranged on both sides of the slider engagement portion in the suspension width direction. The paired right and left movable jigs are engaged with the paired jig engagement portions and then moved toward the proximal side in the suspension longitudinal direction, whereby the paired longitudinal direction accordion-like spring portions are expanded.

In the configuration, an expanding amount of the paired longitudinal direction accordion-like spring portions in the suspension longitudinal direction and a moving amount of the slider engagement portion in the suspension longitudinal direction become equal to each other. That is, in the conventional configuration, it is necessary to elastically expand the paired longitudinal direction accordion-like spring portions in the suspension longitudinal direction by X mm in order to move the slider engagement portion in the suspension longitudinal direction by X mm.

It requires a large operation force in mounting and detaching the magnetic head suspension, which results in worsen workability in mounting and detaching the magnetic head suspension.

The prior art document 1 also discloses, as a modified example, a slider support device in which the proximal-side connection region is provided with a width direction accordion-like spring portion that is inserted therein in a state capable of expanding and contracting in the suspension width direction.

The slider support device is useful in improving stabilization of support of the magnetic head slider since the magnetic head slider is sandwiched in the suspension longitudinal direction by the biasing force of the paired longitudinal direction accordion-like spring portions and is also sandwiched in the suspension width direction by the biasing force of the width direction accordion-like spring portion.

However, just like the conventional configuration, the modified example also has the problems of involving a remarkable increase in cost due to existence of the paired longitudinal direction accordion-like spring portions and worsening durability due to local elastic deformation of the paired longitudinal direction accordion-like spring portions.

Furthermore, the modified example has the same problem as the conventional configuration, with respect to workability in mounting and detaching the magnetic head suspension.

More specifically, in the modified example, a movable jig (hereinafter referred to as first movable jig), which is engaged with a jig engagement portion arranged on a first side of the proximal-side connection region in the suspension width direction, is moved in a direction (hereinafter referred to as first oblique direction) that is toward the proximal side in the suspension longitudinal direction and the first side in the suspension width direction, and another movable jig (hereinafter referred to as second movable jig), which is engaged with a jig engagement portion arranged on a second side of the proximal-side connection region in the suspension width direction, is moved in a direction (hereinafter referred to as second oblique direction) that is toward the proximal side in the suspension longitudinal direction and the second side in the suspension width direction, whereby the paired longitudinal direction accordion-like spring portions can be expanded in the suspension longitudinal direction and, at the same time, the width direction accordion-like spring portion can be expanded in the suspension width direction.

That is, the paired longitudinal direction accordion-like spring portions are expanded in the suspension longitudinal direction by an amount corresponding to a component along the suspension longitudinal direction out of a movement amount of the first and second movable jigs, and the width direction accordion-like spring portion is expanded in the suspension width direction by an amount corresponding to a component along the suspension width direction out of the movement amount.

In this case, the slider engagement portion is moved in the suspension longitudinal direction by an expanded amount of the paired longitudinal direction accordion-like spring portions in the suspension longitudinal direction.

As described above, the modified example is common to the conventional configuration in that the paired longitudinal direction accordion-like spring portions have to be expanded in the suspension longitudinal direction by X mm in order to move the slider engagement portion in the suspension longitudinal direction by X mm.

SUMMARY OF THE INVENTION

The present invention has been achieved in view of the conventional art, and an object thereof is to provide a magnetic head slider locking apparatus for detachably mounting a magnetic head slider to a magnetic head suspension, wherein it is capable of reducing costs and improving durability while securing a large stroke in the suspension longitudinal direction for opening and closing and generating a sufficiently strong biasing force for sandwiching the magnetic head slider in the suspension longitudinal direction, and also improving workability in mounting and detaching the magnetic head slider.

In order to achieve the object, the present invention provides a magnetic head slider locking apparatus for detachably mounting a magnetic head slider to a magnetic head suspension.

The magnetic head suspension includes a supporting part that is swung about a swing center directly or indirectly by an actuator, a load bending part that generates a load for pressing a magnetic head slider toward a disk surface, a load beam part that is supported by the supporting part through the load bending part and transmits the load to the magnetic head slider, and a flexure part that is supported by the load beam part. The flexure part has a flexure substrate that integrally includes a load beam part overlap region fixed to the load beam part in a state of being overlapped therewith, paired arm regions extending toward a distal side from both ends of the load beam part overlap region in a suspension width direction, a connection region extending in the suspension width direction so as to connect distal ends of the paired arm regions, and a head mount region which extends from the connection region toward a proximal side in the suspension longitudinal direction so as to be positioned between the paired arm regions and to which the magnetic head slider is mounted.

The magnetic head slider locking apparatus according to the present invention integrally includes a fixed portion, a movable portion and paired right and left spring portions. The fixed portion is directly or indirectly fixed to the flexure substrate and includes a distal-side engagement region engaged with a distal end of the magnetic head slider in a state of being directly or indirectly mounted on the head mount region. The movable portion is capable of moving relatively with respect to the flexure substrate and includes paired right and left proximal-side engagement regions that are away from each other in the suspension width direction and are engaged with a distal end of the magnetic head slider in a state of being directly or indirectly mounted on the head mount region. The paired spring portions press the movable portion in such a way that the paired proximal-side engagement regions sandwich the magnetic head slider in cooperation with the distal-side engagement region.

The movable portion includes paired right and left arm regions and a connecting region in addition to the paired right and left proximal-side engagement regions. The paired arm regions extend toward the proximal side in the suspension longitudinal direction directly or indirectly from inner ends of the paired proximal-side engagement regions in the suspension width direction. The connecting region connects the paired arm regions.

Each of the paired spring portions includes a distal-side extending region, a proximal-side extending region and a biasing region. The distal-side extending region extends toward the distal side in the suspension longitudinal direction from the fixed portion. The proximal-side extending region extends toward the proximal side in the suspension longitudinal direction from an outer end of the corresponding proximal-side engagement region. The biasing region connects a distal end of the distal-side extending region and a proximal end of the proximal-side extending region and is convex toward an outer side in the suspension width direction.

The magnetic head slider locking apparatus takes the initial posture when no external operation force is applied thereto, an elastically deformed posture when an external operation force toward the proximal side in the suspension longitudinal direction is applied to the connecting region of the movable portion, and a sandwiching posture when the external operation force is canceled after the magnetic head slider is mounted directly or indirectly to the head mount region in a state where the magnetic head slider locking apparatus takes the elastically deformed posture. When the apparatus takes the initial posture, the proximal-side engagement regions is positioned on the distal side in the suspension longitudinal direction farther than the proximal end of the magnetic head slider that is mounted directly or indirectly to the head mount region with its distal end being engaged with the distal-side engagement region. When the apparatus takes the elastically deformed posture, the biasing regions are expanded in the suspension longitudinal direction so that the proximal-side engagement regions are positioned on the proximal side in the suspension longitudinal direction farther than the proximal end of the magnetic head slider. When the apparatus takes the sandwiching posture, the paired proximal-side engagement regions are positioned at a sandwiching position for sandwiching the magnetic head slider in the suspension longitudinal direction in cooperation with the distal-side engagement region.

Upon transition from the initial posture to the elastically deformed posture, the movable portion is wholly moved toward the proximal side in the suspension longitudinal direction and, at the same time, the inner end of each of the proximal-side engagement regions in the suspension width direction is moved toward the inner side in the suspension width direction, so that the distal end and the proximal end of each of the proximal-side extending regions are moved toward the inner side and the outer side in the suspension width direction, respectively, while the proximal-side extending regions are wholly moved toward the proximal side in the suspension longitudinal direction.

The magnetic head slider locking apparatus according to the present invention makes it possible to reduce costs and improve durability while securing a large stroke in the suspension longitudinal direction for opening and closing and generating a sufficiently strong biasing force for sandwiching the magnetic head slider in the suspension longitudinal direction since it integrally includes the fixed portion having the distal-side engagement region that is engaged with a distal end of the magnetic head slider in a state of being directly or indirectly mounted on the head mount region, the movable portion having the paired right and left proximal-side engagement regions that are away from each other in the suspension width direction and are engaged with a distal end of the magnetic head slider in a state of being directly or indirectly mounted on the head mount region, and the paired spring portions that press the movable portion in such a way that the paired proximal-side engagement regions sandwich the magnetic head slider in cooperation with the distal-side engagement region.

Furthermore, the apparatus according to the present invention makes it possible to make a distance by which the biasing regions of the paired spring portions have to be expanded in the suspension longitudinal direction upon a transition from the initial posture to the elastically deformed posture shorter than a distance by which the proximal-side engagement regions have to be moved in the suspension longitudinal direction upon the transition, since, upon the transition from the initial posture to the elastically deformed posture, the movable portion is wholly moved toward the proximal side in the suspension longitudinal direction and, at the same time, the inner end of each of the proximal-side engagement regions in the suspension width direction is moved toward the inner side in the suspension width direction, so that the distal end and the proximal end of each of the proximal-side extending regions are moved toward the inner side and the outer side in the suspension width direction, respectively, while the proximal-side extending regions are wholly moved toward the proximal side in the suspension longitudinal direction.

That is, in accordance with the present invention, upon the transition from the initial posture to the elastically deformed posture, the proximal-side engagement regions are moved toward the proximal side in the suspension longitudinal direction by a combination of an elastically expanding movement of the biasing regions in the suspension longitudinal direction and the above explained movement of the proximal-side extending regions.

Accordingly, the present invention makes it possible to reduce the operation force required for the transition from the initial posture to the elastically deformed posture, thereby enhancing workability in mounting and detaching the magnetic head slider, in comparison to the conventional configuration in which a moving amount of the proximal-side engagement regions toward the proximal side in the suspension longitudinal direction is secured by means of only an elastically deformed movement of paired longitudinal direction accordion-like spring portions along the suspension longitudinal direction.

In one embodiment, the magnetic head slider locking apparatus further includes a single center distal-side extending region that extends from a center of the fixed portion in the suspension width direction toward the distal side in the suspension longitudinal direction, wherein the center distal-side extending region functions as both the distal-side extending regions of the paired spring portions.

In another embodiment, the distal-side extending region of each of the paired spring portions may include an inclined area inclined to the suspension longitudinal direction so as to extend from the fixed portion toward the inner side in the suspension width direction and the distal side in the suspension longitudinal direction, and a longitudinal direction extending area that extends from a distal end of the inclined area toward the distal side along the suspension longitudinal direction.

In any one of the above various configurations, there may be provided a base plate fixed to a surface of the head mount region that faces the disk surface, and the fixed portion may include paired right and left longitudinal direction regions that are positioned on the outer side in the suspension width direction farther than the distal-side engagement region and extend in the suspension longitudinal direction. In this case, the paired longitudinal direction regions are fixed to a surface of the base plate that faces the disk surface so that the fixed portion is fixed to the flexure substrate.

More preferably, the paired arm regions and the connecting region may form a generally U-shaped portion into which a movable jig for applying the external operation force can be inserted.

The fixed portion may be provided with paired right and left extending regions, each of which is positioned within a space surrounded by the corresponding distal-side extending region and the corresponding biasing region and extends toward the distal side from the corresponding longitudinal direction region. Each of the extending regions may be provided with a fixed jig engagement portion with which a fixed jig for maintaining the fixed portion at a fixed position against the external operation force by the movable jig can be engaged, the fixed jig engagement portion being positioned so as not to be overlapped with both load beam part and the flexure part.

The base plate preferably includes a center region fixed to the head mount region and paired right and left side regions extending from the center region toward both sides in the suspension width direction. In this case, there is provided a step between each of the side regions and the center region so that there is provided a space in a direction orthogonal to the disk surface between each of the side regions and the flexure substrate in a state where the center region is fixed to the head mount region, and the paired longitudinal direction regions are fixed to surfaces of the paired side regions that face the disk surface.

The flexure part may include a wiring structure that has an insulating layer laminated on the flexure substrate, and a slider conductive layer having a proximal end capable of being electrically connected to an outside and laminated on the insulating layer.

In this case, the distal-side engagement region may be preferably provided with a slider electrical connection structure. The slider electrical connection structure includes an insulating layer that is provided to the distal-side engagement region, and a slider conductive member that is provided to the insulating layer so that a distal end of the slider conductive layer is electrically connected to the magnetic head slider by way of the slider conductive member.

BRIEF DESCRIPTION OF THE DRAWINGS

FIGS. 5A to 5C are plan views of the magnetic head slider locking apparatus according to the embodiment, and FIGS. 5A to 5C show an initial posture, an elastically deformed posture and a sandwiching posture of the magnetic head slider locking apparatus, respectively.

DETAILED DESCRIPTION OF THE PREFERRED EMBODIMENTS

Hereinafter, one preferred embodiment of a magnetic head slider locking apparatus according to the present invention will be described, with reference to the attached drawings.

Figure 1:
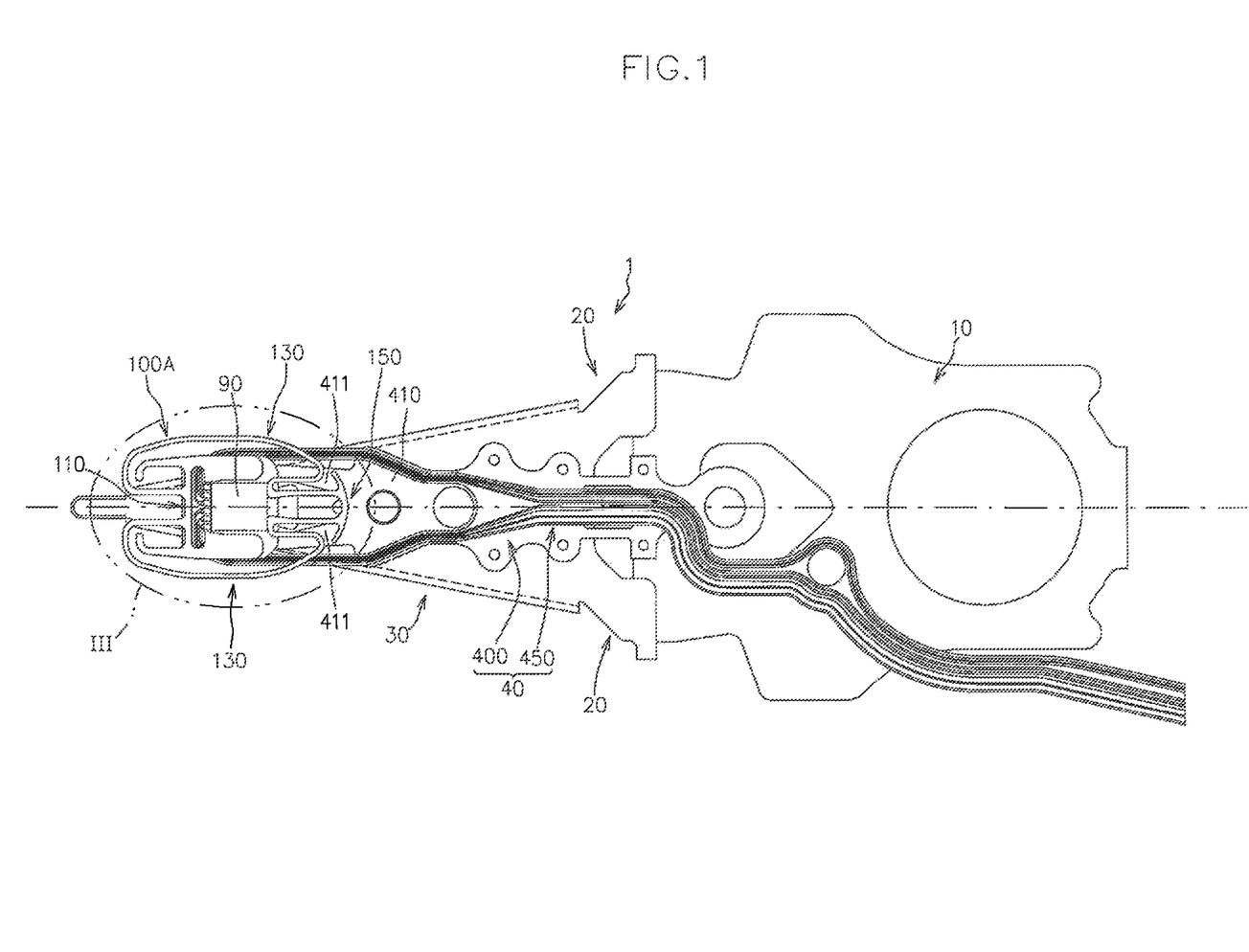
FIG. 1 is a bottom view of a magnetic head suspension with a magnetic head slider being mounted thereto with use of a magnetic head slider locking apparatus according to an embodiment of the present invention.

FIG. 1 is a bottom view (a bottom plan view as viewed from a side close to a disk surface) of a magnetic head suspension 1 to which a magnetic head slider locking apparatus 100A according to the present embodiment is mounted. FIG. 1 indicates welding points with small circles.

Figure 2:
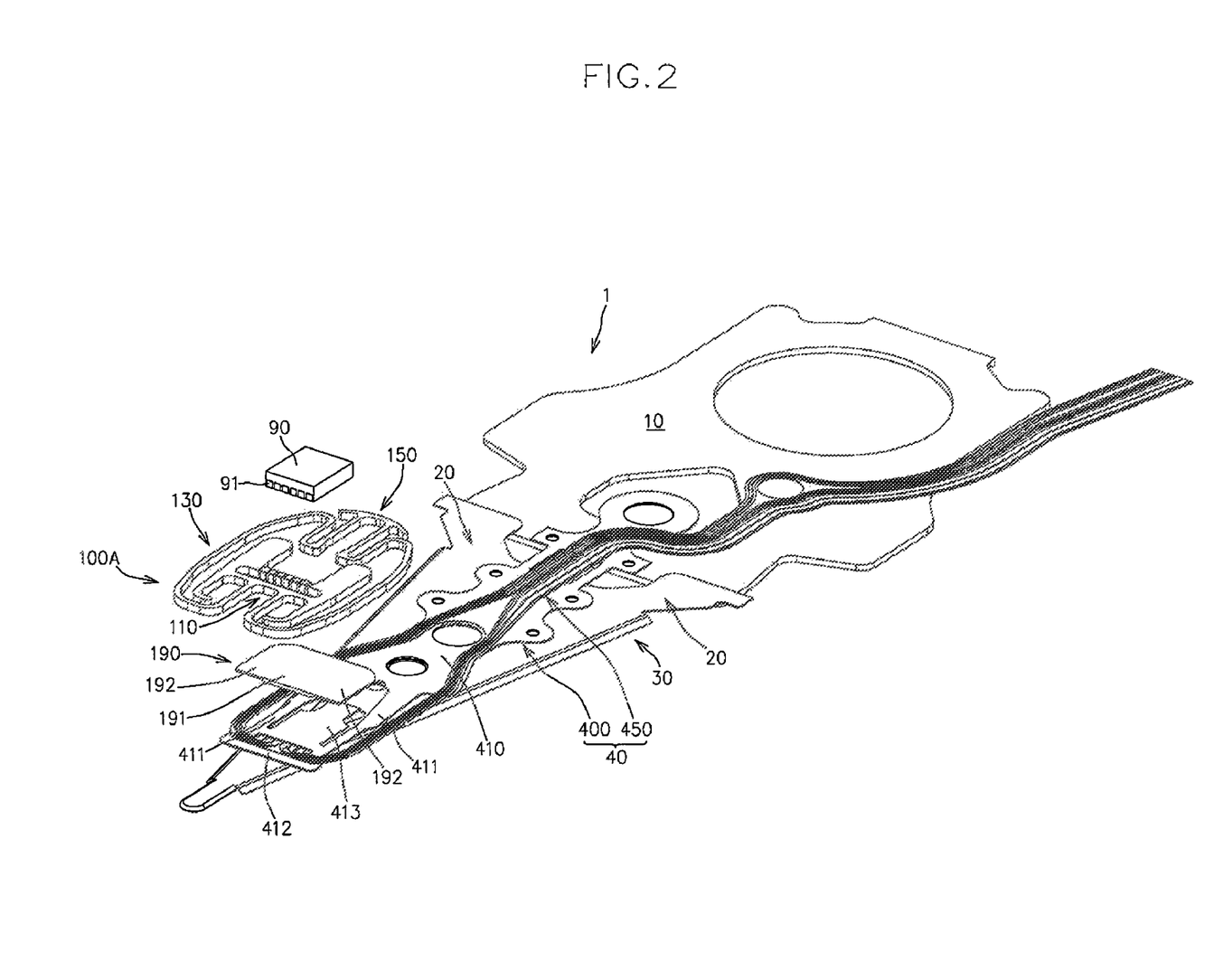
FIG. 2 is an exploded perspective view of the magnetic head suspension shown in FIG. 1.

FIG. 2 is an exploded perspective view of a magnetic head slider 90, the magnetic head slider locking apparatus 100A and the magnetic head suspension 1, as viewed from the side close to the disk surface.

The magnetic head slider locking apparatus 100A is a member for detachably mounting the magnetic head slider 90 to the magnetic head suspension 1.

More specifically, the magnetic head slider locking apparatus 100A is capable of causing the magnetic head slider 90 to be retained at the magnetic head suspension 1 so as to allow performance tests of the magnetic head slider 90 regarding reading properties and/or writing properties as well as levitation properties thereof to be conducted under a used condition where the magnetic head slider 90 is actually mounted to the magnetic head suspension 1, and is also capable of easily detaching the magnetic head slider 90 from the magnetic head suspension 1 when the magnetic head slider 90 is defective.

The magnetic head suspension 1 to which the magnetic head slider locking apparatus 100A is applied is firstly explained.

As shown in FIGS. 1 and 2, the magnetic head suspension 1 includes a supporting part 10 that is swung about a swing center directly or indirectly by an actuator such as a voice coil motor, a load bending part 20 that generates a load for pressing the magnetic head slider 90 toward the disk surface, a load beam part 30 that is supported by the supporting part 10 through the load bending part 20 and transmits the load to the magnetic head slider 50, and a flexure part 40 that is supported by the load beam part 30.

In the illustrated embodiment, the supporting part 10 is formed as a base plate including a boss portion to which a distal end of a carriage arm (not shown) is joined by swage processing, the carriage arm being connected to the actuator. However, it is of course possible that the supporting part 10 is formed as an arm that is directly connected to the swing center of the actuator.

As shown in FIGS. 1 and 2, the flexure part 40 includes a flexure substrate 400 fixed to the load beam part 30 and the supporting part 10, and a wiring structure 450 laminated on the flexure substrate 400.

The flexure substrate 400 includes a load beam part overlap region 410 fixed to the load beam part 30 by welding or the like in a state of being overlapped with the load beam part 30, paired arm regions 411 that extend toward a distal side from both ends in a suspension width direction of the load beam part overlap region 410, a connection region 412 that extends in the suspension width direction so as to connect distal ends of the paired arm regions 411, and a head mount region 413 which extends from the connection region 412 toward a proximal side in the suspension longitudinal direction so as to be positioned between the paired arm regions 411 and to which the magnetic head slider 90 is mounted.

The magnetic head slider locking apparatus 100A according to the present embodiment will now be explained.

The magnetic head slider locking apparatus 100A is capable of detachably mounting the magnetic head slider 90 on the head mount region 413.

Figure 3:
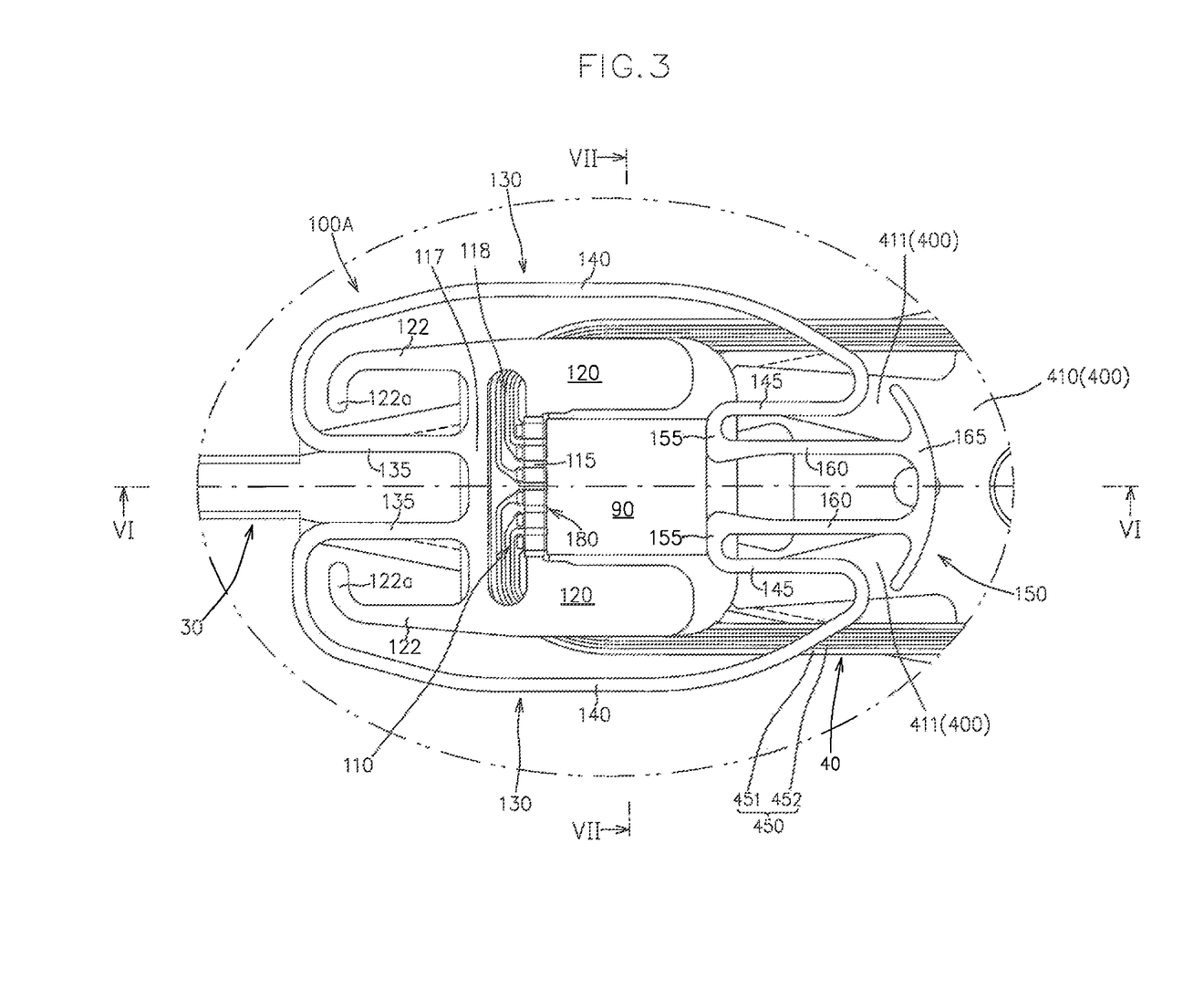
FIG. 3 is an enlarged view of portion III in FIG. 1.

FIG. 3 is an enlarged view of portion III in FIG. 1.

Figure 4:
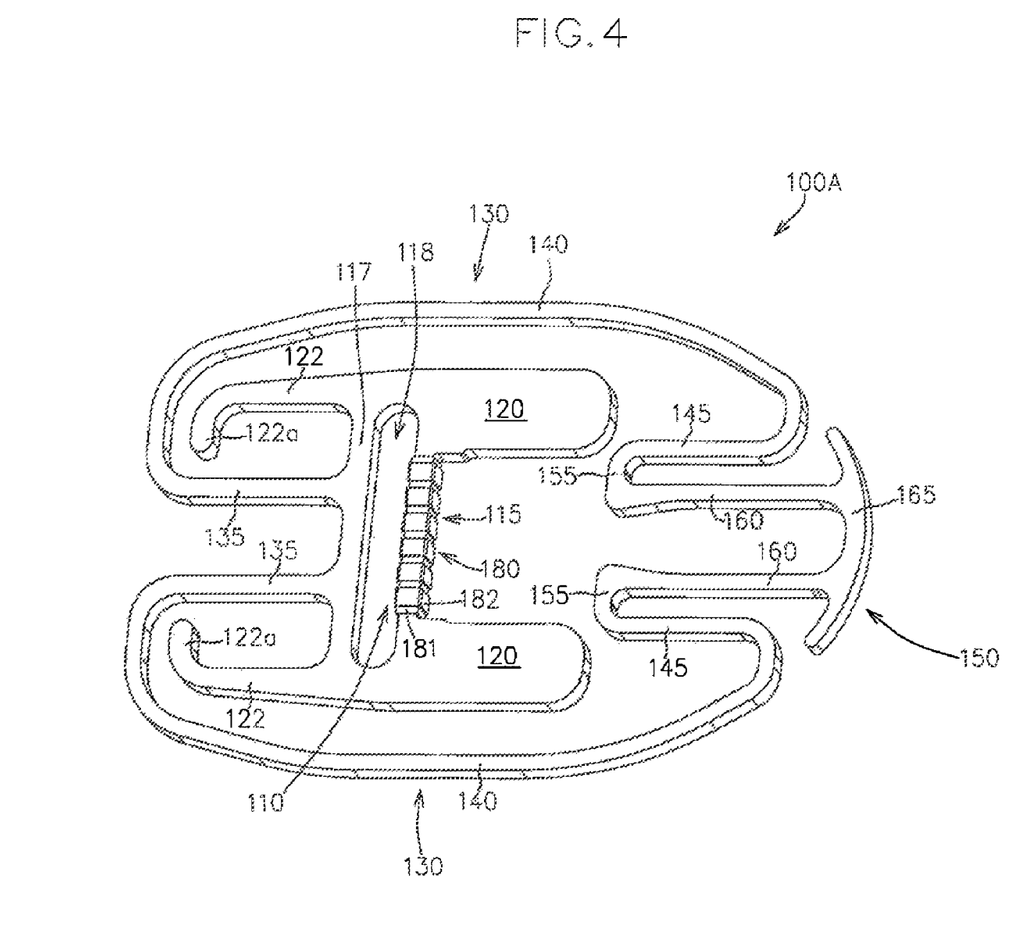
FIG. 4 is a perspective view of the magnetic head slider locking apparatus according to the embodiment.

FIG. 4 is a perspective view of the magnetic head slider locking apparatus 100A.

As shown in FIGS. 3 and 4 or the like, the magnetic head slider locking apparatus 100A integrally includes a fixed portion 110 directly or indirectly fixed to the flexure substrate 400, a movable portion 150 capable of moving relatively with respect to the flexure substrate 400, and paired right and left spring portions 130 connecting the fixed portion 110 and the movable portion 150.

As shown in FIGS. 3, 4 or the like, the fixed portion 110 includes a distal-side engagement region 115 engaged with a distal end of the magnetic head slider 90 that is under a condition (hereinafter referred to as mounted condition) of being directly or indirectly mounted on the head mount region 413.

As shown in FIGS. 3, 4 or the like, the movable portion 150 includes paired right and left proximal-side engagement regions 155 that are away from each other in the suspension width direction and are engaged with the distal side of the magnetic head slider 90 being under the mounted condition, paired right and left arm regions extending toward the proximal side in the suspension longitudinal direction directly or indirectly from inner ends of the paired proximal-side engagement regions 155 in the suspension width direction, and a connecting region 165 connecting the paired arm regions 160.

The paired spring portions 130 presses the movable portion 150 in such a way that the paired proximal-side engagement regions 155 sandwich the magnetic head slider 90 in cooperation with the distal-side engagement region 115.

More specifically, as shown in FIGS. 3, 4 or the like, each of the paired spring portions 130 includes a distal-side extending region 135 extending toward the distal side in the suspension longitudinal direction from the fixed portion 110, a proximal-side extending region 145 extending toward the proximal side in the suspension longitudinal direction from an outer end of the corresponding proximal-side engagement region 155, and a biasing region 140 that connects a distal end of the distal-side extending region 135 and a proximal end of the proximal-side extending region 145 and is convex toward an outer side in the suspension width direction.

Figure 5A:
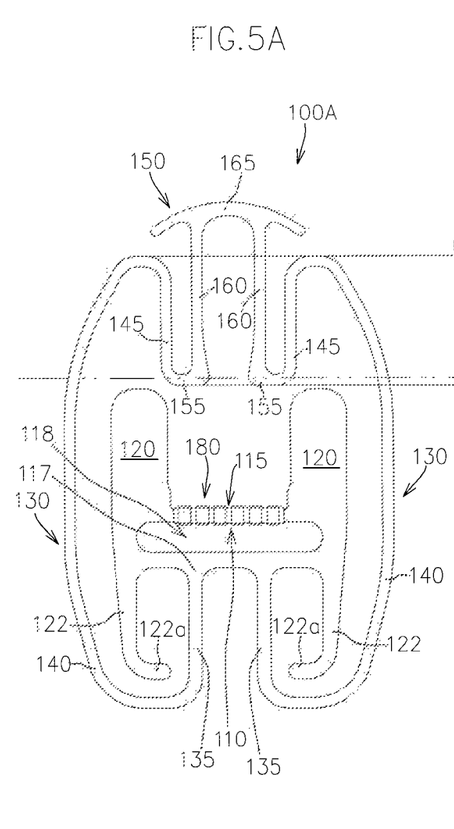
Figure 5B:
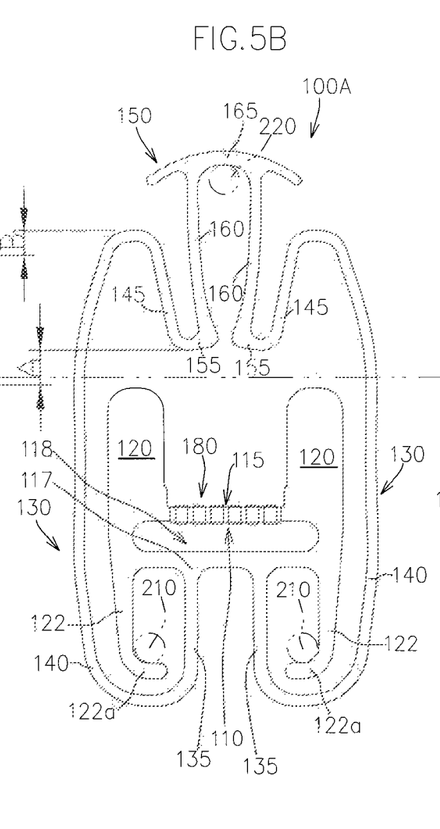
Figure 5C:
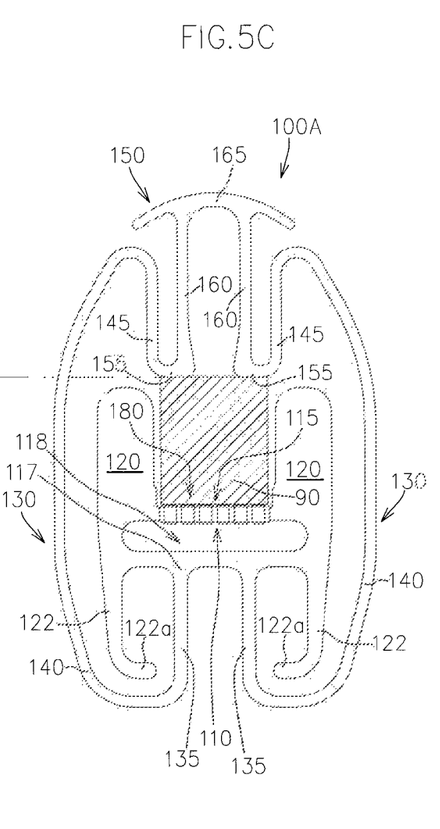

FIGS. 5A to 5C show an initial posture, an elastically deformed posture and a sandwiching posture of the magnetic head slider locking apparatus 100A, respectively.

As shown in FIG. 5A, the magnetic head slider locking apparatus 100A takes the initial posture in which the proximal-side engagement regions 155 are positioned on the distal side in the suspension longitudinal direction farther than the proximal end of the magnetic head slider 90 under the mounted condition, when no external operation force is applied thereto.

As shown in FIG. 5B, the magnetic head slider locking apparatus 100A takes the elastically deformed posture in which the biasing regions 140 are expanded in the suspension longitudinal direction so that the proximal-side engagement regions 155 are positioned on the proximal side in the suspension longitudinal direction farther than the proximal end of the magnetic head slider 90 under the mounted condition, when an external operation force toward the proximal side in the suspension longitudinal direction is applied to the connecting region 165 of the movable portion 150.

The magnetic head slider locking apparatus 100A take the sandwiching posture in which the paired proximal-side engagement regions 155 are positioned at a sandwiching position for sandwiching the magnetic head slider 90 in the suspension longitudinal direction in cooperation with the distal-side engagement region 115, when the external operation force is canceled after the magnetic head slider 90 is mounted directly or indirectly to the head mount region 413 in a state where the magnetic head slider locking apparatus 100A takes the elastically deformed posture.

The magnetic head slider locking apparatus 100A configured as described above exerts the following effects.

As referred to in the explanation of the related art, as a member for detachably supporting a magnetic head slider, there has been proposed the slider support device including paired right and left longitudinal direction spring portions that are disposed on both sides of the magnetic head slider in the suspension width direction.

The conventional slider support device has a problem of increasing costs and worsening durability since it secures the biasing force for sandwiching the magnetic head slider with respect to the suspension longitudinal direction by means of the paired longitudinal direction accordion-like spring portions.

More specifically, the paired longitudinal direction accordion-like spring portions has convex portions and concave portions arranged alternately in the suspension longitudinal direction, the convex and concave portions being convex toward the outer side and the inner side in the suspension width direction, respectively.

Since apexes of the convex portion and the concave portion have small curvature radiuses, respective elastic deformation amounts of the convex portion and the concave portion in the suspension longitudinal direction are small. Therefore, in order to allow the longitudinal direction accordion-like spring portion to be elastically deformed in the suspension longitudinal direction by a length more than a predetermined length, the longitudinal direction accordion-like spring portion has to include a substantial number of sets of the convex portion and the concave portion.

Accordingly, the conventional configuration that secure the biasing force in the suspension longitudinal direction by means of the paired longitudinal direction accordion-like spring portions has a problem of increasing costs.

Moreover, the apexes of the convex portions and the concave portions are locally and elastically deformed upon expanding and contracting motion of the paired longitudinal direction accordion-like spring portions. Therefore, the conventional configuration also has a problem on durability thereof.

To the contrary, the magnetic head slider locking apparatus 100A according to the present embodiment secures the biasing force for sandwiching the magnetic head slider in the suspension longitudinal direction by means of the paired spring portions 130 each of which includes the distal-side extending region 135 extending toward the distal side in the suspension longitudinal direction from the fixed portion 110, the proximal-side extending region 145 extending toward the proximal side in the suspension longitudinal direction from the outer end of the corresponding proximal-side engagement region 155, and the biasing region 140 that connects the distal end of the distal-side extending region 135 and the proximal end of the proximal-side extending region 145 and is convex toward the outer side in the suspension width direction.

The magnetic head slider locking apparatus 100A makes it possible to realize cost reductions and enhanced durability in comparison to the conventional configuration that secures the biasing force for sandwiching the magnetic head slider in the suspension longitudinal direction by means of the paired longitudinal direction accordion-like spring portions.

Furthermore, as shown in FIGS. 5A and 5B, in the magnetic head slider locking apparatus 100A according to the present embodiment, upon the transition from the initial posture to the elastically deformed posture, the movable portion 150 is wholly moved toward the proximal side in the suspension longitudinal direction and, at the same time, the inner ends of the proximal-side engagement regions 155 are moved toward the inner side in the suspension width direction. The movement causes the distal end and the proximal end of the proximal-side extending region 145 to be moved toward the inner side and the outer side in the suspension width direction, respectively, while causing the proximal-side extending region 145 to be wholly moved toward the proximal side in the suspension longitudinal direction.

In the configuration, the movement in which the paired biasing regions 140 are elastically expanded in the suspension longitudinal direction and the movement in which the distal end and the proximal end of the proximal-side extending region 145 are moved toward the inner side and the outer side in the suspension width direction, respectively, while the proximal-side extending region 145 being moved toward the proximal side in the suspension longitudinal direction as a whole make a contribution to move the proximal-side engagement regions 155 toward the proximal side in the suspension longitudinal direction.

More specifically, the moving amount of the proximal-side engagement regions 155 upon the transition from the initial posture to the elastically deformed posture is secured by not only the expanding movement in which the paired biasing regions 140 are expanded in the suspension longitudinal direction but also the movement of the proximal-side extending region 145 that is explained earlier.

That is, in the present embodiment, as shown in FIGS. 5A and 5B, in order to move the proximal-side engagement regions 155 toward the proximal side in the suspension longitudinal direction by a distance A, it is not necessary to expand the paired biasing regions 140 in the suspension longitudinal direction by a distance same as the distance A, but it is enough to expand the paired biasing regions 140 in the suspension longitudinal direction by a distance B shorter than the distance A while making up a shortfall (difference between the distance A and the distance B) by the movement of the proximal-side extending region 145.

Accordingly, the present embodiment makes it possible to secure a large stroke in the suspension longitudinal direction for opening and closing while reducing an operation force required for mounting and detaching the magnetic head slider 90 as much as possible, in comparison to the conventional configuration in which the moving amount of the proximal-side engagement regions 155 toward the proximal side in the suspension longitudinal direction for mounting and detaching the magnetic head slider 90 is secured by means of only the elastically deformed movement of the longitudinal direction accordion-like spring portions.

The magnetic head slider locking apparatus 100A according to the present embodiment is mounted to the magnetic head suspension 1 via a base plate 190.

Specifically, as shown in FIG. 2, there is provided the base plate 190 fixed to a surface of the head mount region 413 that faces the disk surface.

As shown in FIGS. 3, 4 or the like, the fixed portion 110 includes paired right and left longitudinal direction regions 120 extending toward the proximal side in the suspension longitudinal direction from the outer ends of the distal-side engagement region 115 in the suspension width direction.

The paired longitudinal direction regions 120 are fixed to a surface of the base plate 190 that faces the disk surface so that the fixed portion 110 is fixed to the flexure substrate 400.

The configuration makes it possible to improve stabilization of support of the magnetic head slide locking apparatus 100A.

Figure 6:
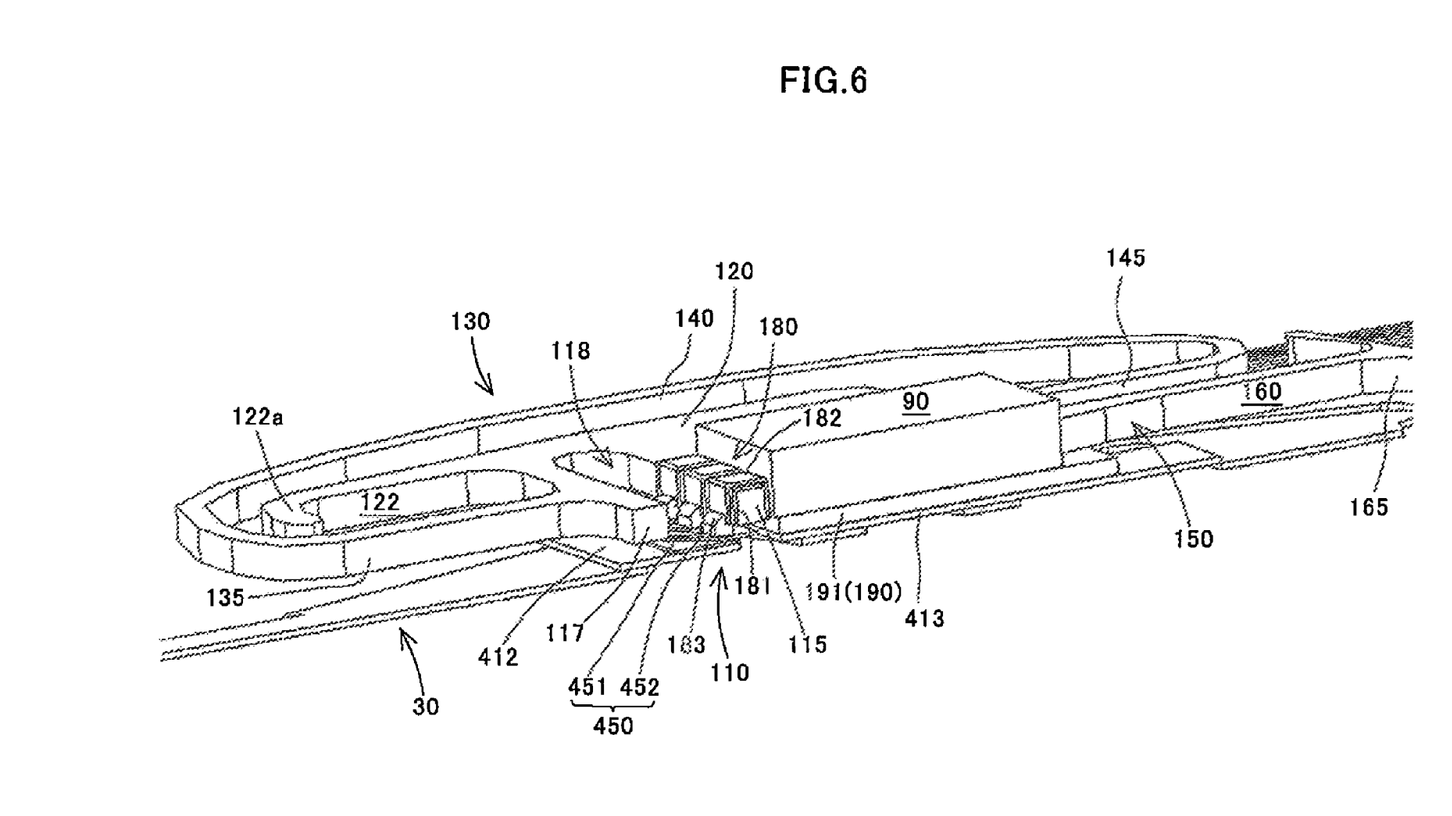
FIG. 6 is a cross sectional perspective view taken along line VI-VI of FIG. 3.
Figure 7:
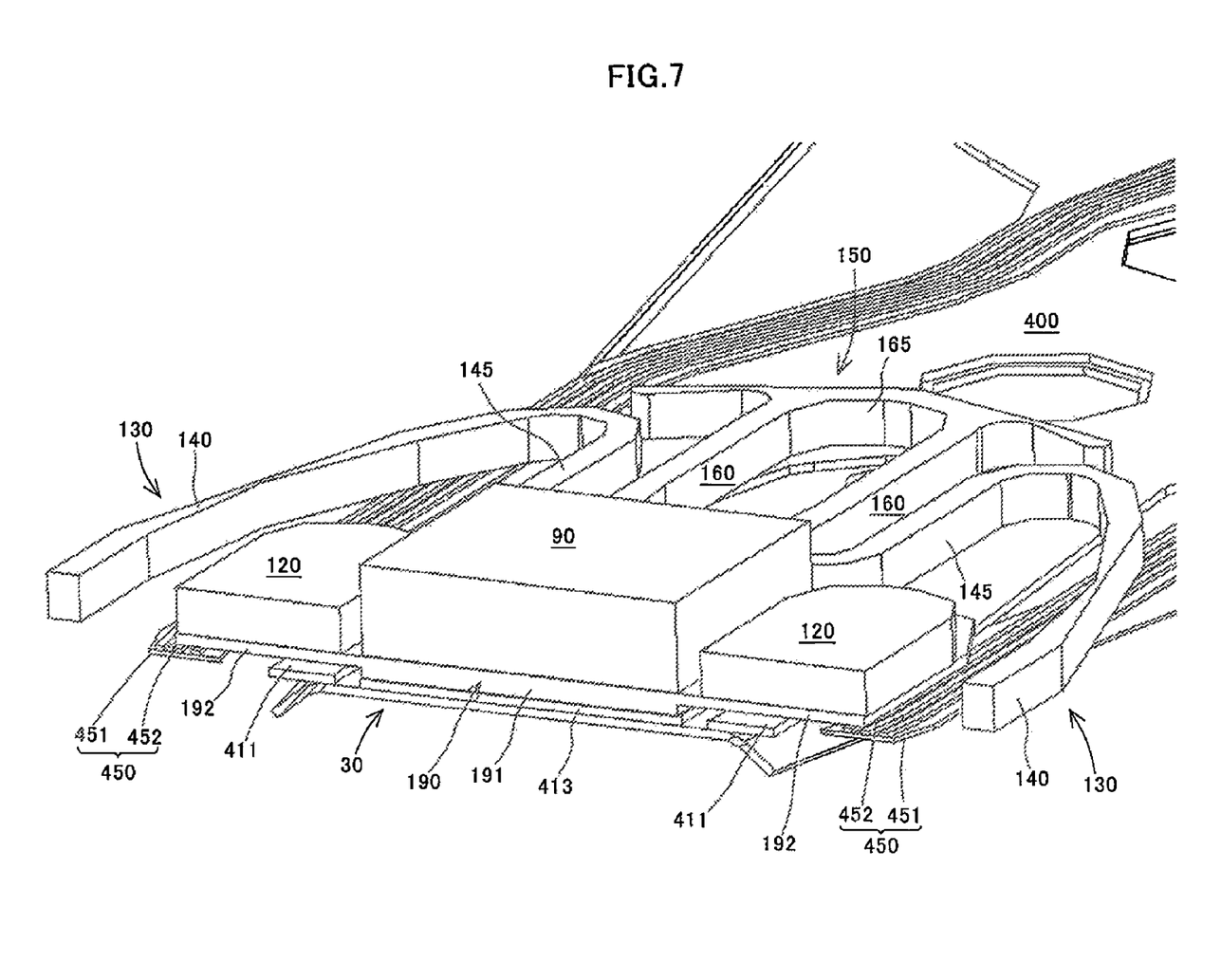
FIG. 7 is a cross sectional perspective view taken along line VII-VII of FIG. 3.

FIGS. 6 and 7 are cross sectional perspective views taken along line VI-VI and line VII-VII of FIG. 3, respectively.

As shown in FIGS. 2 and 7, the base plate 190 preferably includes a center region 191 fixed to the head mount region 413 and paired right and left side regions 192 extending from the center region 191 toward both sides in the suspension width direction. There is provided a step between each of the side regions 192 and the center region 191 so that there is provided a space in a direction orthogonal to the disk surface between each of the side regions 192 and the flexure substrate 400 in a state where the center region 191 is fixed to the head mount region 413.

In this case, the paired longitudinal direction regions 120 are fixed to surfaces of the paired side regions 192 that face the disk surface.

As described above, the step is provided on the surface of the base plate 190 that faces the flexure substrate 400 so that the surface of the side regions 192 that face the flexure substrate 400 are farther away from the flexure substrate 400 than that of the center region 191. The configuration makes it possible to provide the locking apparatus with the base plate 190 while effectively preventing the paired arm regions 411 of the flexure substrate 400 from interfering with the base plate 190, as shown in FIG. 7.

Figure 8:
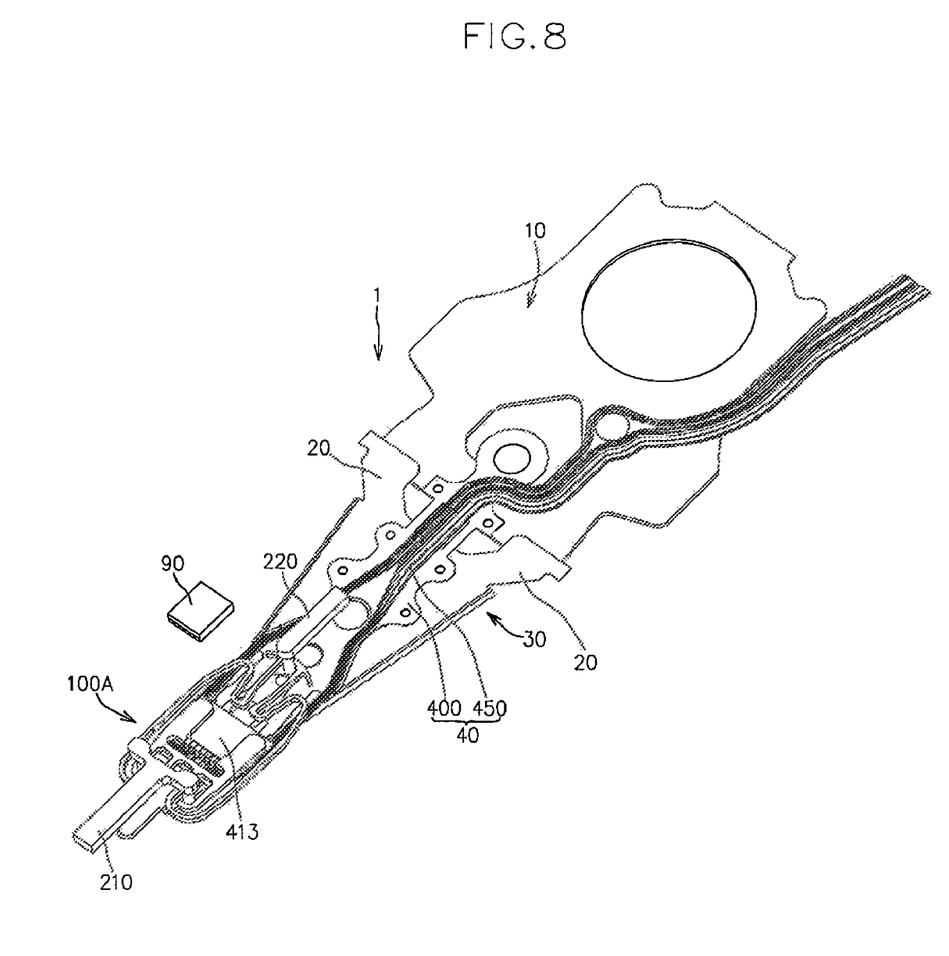
FIG. 8 is a perspective view of the magnetic head slider locking apparatus according to the embodiment in a state of being elastically deformed by means of a movable jig and a fixed jig.

FIG. 8 is a perspective view of the magnetic head slider locking apparatus 100A in a state of being set at the elastically deformed posture by means of a movable jig 220 and a fixed jig 210.

As shown in FIGS. 5B and 8, in the magnetic head slider locking apparatus 100A according to the present embodiment, the arm regions 160 and the connecting region 165 form a generally U-shaped portion into which the movable jig 220 for applying the external operation force could be inserted.

Furthermore, in the present embodiment, as shown in FIGS. 4, 5A to 5C or the like, the fixed portion 110 is provided with paired right and left extending regions 122, each of which extends toward the distal side from the corresponding longitudinal direction region 120 within a space surrounded by the corresponding distal-side extending region 135 and the corresponding biasing region 140.

Each of the extending regions 122 is provided with a fixed jig engagement portion 122a with which the fixed jig 210 for maintaining the fixed portion 110 at a fixed position against the external operation force by the movable jig 220 can be engaged, the fixed jig engagement portion 122a being positioned so as not to be overlapped with both load beam part 30 and the flexure part 40.

The configuration makes it possible to cause the movable jig 220 and the fixed jig 210 to be engaged with the magnetic head slider locking apparatus 100A without involving enlargement of the magnetic head slider locking apparatus 100A.

In the present embodiment, as shown in FIGS. 3 to 5C, the fixed portion 110 includes a distal-side width direction extending region 117 that is positioned on the distal side farther than the distal-side engagement region 115 with a slit 118 being formed between distal-side width direction extending region 117 and the distal-side engagement region 115, the distal-side width direction extending region 117 extending in the suspension width direction.

Each of the longitudinal direction regions 120 extends toward the proximal side in the suspension longitudinal direction beyond the distal-side engagement region 115 while connecting the corresponding ends of the distal-side engagement region 115 and the distal-side width direction extending region 117.

In the configuration, it is possible to utilize the slit 118 as an insert hole into which the fixed jig 210 is inserted. In this case, the paired extending regions 122 can be omitted.

As shown in FIGS. 3, 6 or the like, the magnetic head slider locking apparatus 100A according to the present embodiment is configured to electrically connect the magnetic head slider 90 to the wiring structure 450 of the flexure part 40 upon mounting of the magnetic head slider 90 to the magnetic head suspension 1.

As described above, the flexure part 40 includes the flexure substrate 400 and the wiring structure 450.

As shown in FIGS. 6, 7 or the like, the wiring structure 450 includes an insulating layer 451 laminated on the flexure substrate 400, a slider conductive layer 452 having a proximal end capable of being electrically connected to an outside and laminated on the insulating layer 451, and a protecting layer (not shown) covering the conductive layer 452.

On the other hand, the magnetic head slider locking apparatus 100A has an electrical connection structure 180 provided to the distal-side engagement region 115.

As shown in FIGS. 4 and 6, the electrical connection structure 180 includes an insulating layer 181 that is wrapped around the distal-side engagement region 115, and a slider conductive member 182 that is wrapped around the insulating layer 181. The conductive layer 452 is electrically connected to terminals 90 (see FIG. 2) of the magnetic head slider 90 by way of the conductive member 182 and a solder 183 or the like.

The configuration makes it possible to cause the terminal 91 (see FIG. 2) of the magnetic head slider 90 to be electrically connected to the slider conductive layer 452 only by locking the magnetic head slider 90 to the magnetic head suspension 1 by way of the magnetic head slider locking apparatus 100A.

Figure 9A:
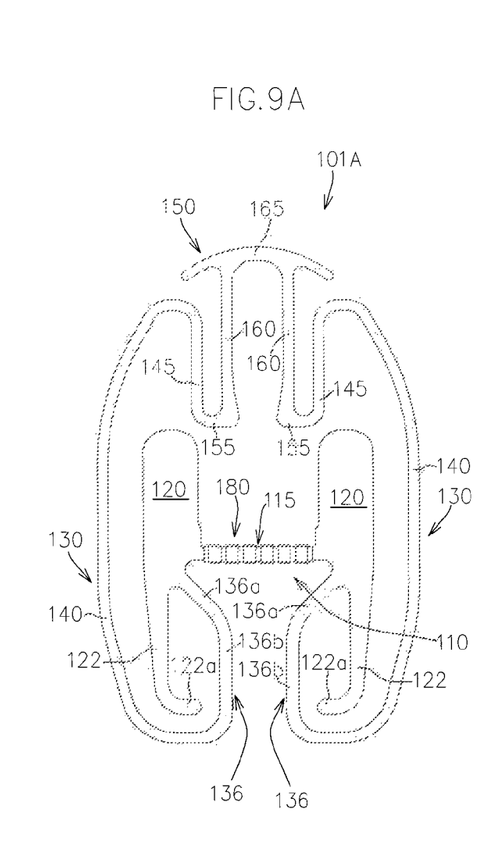
FIGS. 9A to 9C are bottom views of magnetic head slide locking apparatuses according to first to third modifications of the embodiment.
Figure 9B:
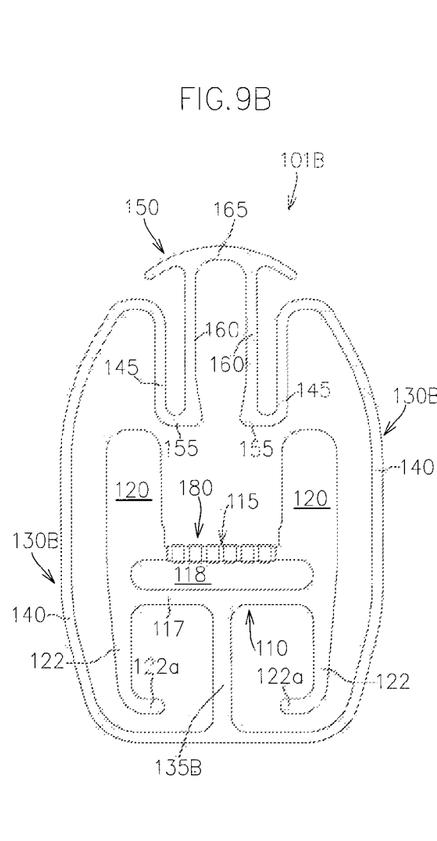
Figure 9C:
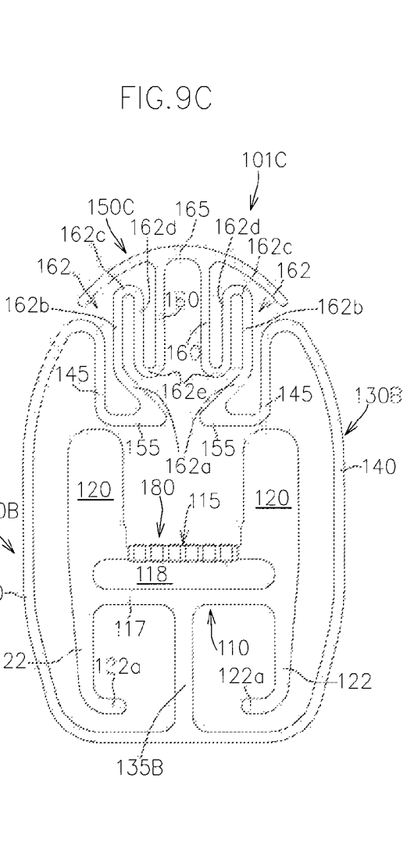

FIGS. 9A to 9C are bottom views of magnetic head slider locking apparatus 101A to 101C according to first to third modifications of the present embodiment.

In the drawings, the members same as those in the present embodiment are denoted by the same reference numerals.

The magnetic head slider locking apparatus 101A according to the first modification is different from the magnetic head slider locking apparatus 100A according to the present embodiment in that the distal-side extending region 135 is replaced by a distal-side extending region 136, as shown in FIG. 9A.

More specifically, the distal-side extending region 135 extends substantially parallel to the suspension longitudinal direction from a proximal end connected to the fixed portion 10 toward a distal end connected to the biasing region 140, as shown in FIGS. 3 to 5C or the like.

On the contrary to this, in the first modification 101A, the distal-side extending region 136 includes an inclined area 136a inclined to the suspension longitudinal direction so as to extend from the fixed portion 110 toward the inner side in the suspension width direction and the distal side in the suspension longitudinal direction, and a longitudinal direction extending area 136b which extends from a distal end of the inclined area 136a toward the distal side along the suspension longitudinal direction and to which the corresponding biasing region 140 is connected, as shown in FIG. 9A.

As described above, the distal-side extending region 136 is provided with the inclined area 136a extending from the proximal end connected to the fixed portion 110 toward the inner side in the suspension width direction and the distal side in the suspension longitudinal direction. The configuration makes it possible to effectively prevent concentration of a stress onto the proximal end of the distal-side extending region 136 upon transition from the initial posture to the elastically deformed posture, and allow the paired spring portions 130 to be elastically deformed without difficulty.

The magnetic head slider locking apparatus 101B according to the second modification is different from the magnetic head slider locking apparatus 100A according to the present embodiment in that the paired spring portions 130 are replaced by paired spring portions 130B, as shown in FIG. 9B.

More specifically, the paired spring portions 130 in the magnetic head slider locking apparatus 100A according to the present embodiment are entirely separate from each other.

On the contrary to this, in the second modification 101B, the paired spring portions 130B are common to each other with respect to a distal-side extending region 135B while being separate from each other with respect to the proximal-side extending region 145 and the biasing region 140.

More specifically, the magnetic head slider locking apparatus 101B according to the second modification includes a single center distal-side extending region that extends from a center of the fixed portion 110 in the suspension width direction toward the distal side in the suspension longitudinal direction. The center distal-side extending region functions as both the distal-side extending regions 135 of the paired spring portions 130B.

The magnetic head slider locking apparatus 101B with the configuration according to the second modification can realize the same effects as the magnetic head slider locking apparatus 100A according to the present embodiment.

The magnetic head slider locking apparatus 101C according to the third modification is different from the magnetic head slider locking apparatus 101B according to the second modification in that the movable portion 150 is replaced by a movable portion 150C.

More specifically, in the second modification 101B as well as the present embodiment 100A and the first modification 101A, the arm region 160 extends linearly toward the proximal side in the suspension longitudinal direction from the inner end of the corresponding proximal-side engagement region 155 in the suspension width direction.

On the contrary to this, in the third modification 101C, the arm region 160 is connected by way of an intermediate region 162 to the inner end of the corresponding proximal-side engagement region 155 in the suspension width direction.

More specifically, the movable portion 150C includes the paired intermediate regions 162 each of which connects the inner end of the corresponding proximal-side engagement region 155 in the suspension width direction and the distal end of the corresponding arm region 160, in addition to the paired proximal-side engagement regions 155, the paired arm regions 160 and the connecting region 165.

In the third modification 101C, the intermediate region 162 includes an inclined area 162a extending from the inner end of the corresponding proximal-side engagement region 155 in the suspension width direction toward the outer side in the suspension width direction and the proximal side in the suspension longitudinal direction, an outer-side longitudinal direction extending area 162b extending from a proximal end of the inclined area 162a toward the proximal side in the suspension longitudinal direction, and an inner-side longitudinal direction extending area 162d extending from a proximal end of the outer-side longitudinal direction extending area 162b toward the distal side in the suspension longitudinal direction through a direction-changing area 162c.

A distal end of the inner-side longitudinal direction extending area 162d is connected to the distal end of the corresponding arm region through a direction-changing area 162e.

The magnetic head slider locking apparatus 101C with the configuration according to the third modification can realize the same effects as the magnetic head slider locking apparatus 101B according to the second modification.

It is of course possible to apply the movable portion 150C to any one of the magnetic head slider locking apparatuses 100A, 101A according to the present embodiment and the first modification.

The invention claimed is:

1. A magnetic head slider locking apparatus for detachably mounting a magnetic head slider to a magnetic head suspension including a supporting part that is swung about a swing center directly or indirectly by an actuator, a load bending part that generates a load for pressing a magnetic head slider toward a disk surface, a load beam part that is supported by the supporting part through the load bending part and transmits the load to the magnetic head slider, and a flexure part that is supported by the load beam part, the flexure part having a flexure substrate that integrally includes a load beam part overlap region fixed to the load beam part in a state of being overlapped therewith, paired arm regions extending toward a distal side from both ends of the load beam part overlap region in a suspension width direction, a connection region extending in the suspension width direction so as to connect distal ends of the paired arm regions, and a head mount region which extends from the connection region toward a proximal side in the suspension longitudinal direction so as to be positioned between the paired arm regions and to which the magnetic head slider is mounted, wherein the magnetic head slider locking apparatus integrally comprises a fixed portion, a movable portion and paired right and left spring portions, the fixed portion being directly or indirectly fixed to the flexure substrate and including a distal-side engagement region engaged with a distal end of the magnetic head slider in a state of being directly or indirectly mounted on the head mount region, the movable portion capable of moving relatively with respect to the flexure substrate and including paired right and left proximal-side engagement regions that are away from each other in the suspension width direction and are engaged with a distal end of the magnetic head slider in a state of being directly or indirectly mounted on the head mount region, the paired spring portions pressing the movable portion in such a way that the paired proximal-side engagement regions sandwich the magnetic head slider in cooperation with the distal-side engagement region, wherein the movable portion includes paired right and left arm regions and a connecting region in addition to the paired right and left proximal-side engagement regions, the paired arm regions extending toward the proximal side in the suspension longitudinal direction directly or indirectly from inner ends of the paired proximal-side engagement regions in the suspension width direction, the connecting region connecting the paired arm regions, wherein each of the paired spring portions includes a distal-side extending region, a proximal-side extending region and a biasing region, the distal-side extending region extending toward the distal side in the suspension longitudinal direction from the fixed portion, the proximal-side extending region extending toward the proximal side in the suspension longitudinal direction from an outer end of the corresponding proximal-side engagement region, the biasing region connecting a distal end of the distal-side extending region and a proximal end of the proximal-side extending region and being convex toward an outer side in the suspension width direction, wherein the magnetic head slider locking apparatus takes the initial posture when no external operation force is applied thereto, an elastically deformed posture when an external operation force toward the proximal side in the suspension longitudinal direction is applied to the connecting region of the movable portion, and a sandwiching posture when the external operation force is canceled after the magnetic head slider is mounted directly or indirectly to the head mount region in a state where the magnetic head slider locking apparatus takes the elastically deformed posture, the proximal-side engagement regions being positioned on the distal side in the suspension longitudinal direction farther than the proximal end of the magnetic head slider that is mounted directly or indirectly to the head mount region with its distal end being engaged with the distal-side engagement region when the apparatus takes the initial posture, the biasing regions being expanded in the suspension longitudinal direction so that the proximal-side engagement regions are positioned on the proximal side in the suspension longitudinal direction farther than the proximal end of the magnetic head slider when the apparatus takes the elastically deformed posture, the paired proximal-side engagement regions being positioned at a sandwiching position for sandwiching the magnetic head slider in the suspension longitudinal direction in cooperation with the distal-side engagement region when the apparatus takes the sandwiching posture, and wherein, upon transition from the initial posture to the elastically deformed posture, the movable portion is wholly moved toward the proximal side in the suspension longitudinal direction and, at the same time, the inner end of each of the proximal-side engagement regions in the suspension width direction is moved toward the inner side in the suspension width direction, so that the distal end and the proximal end of each of the proximal-side extending regions are moved toward the inner side and the outer side in the suspension width direction, respectively, while the proximal-side extending regions are wholly moved toward the proximal side in the suspension longitudinal direction.

2. A magnetic head slider locking apparatus according to claim 1, further comprising a single center distal-side extending region that extends from a center of the fixed portion in the suspension width direction toward the distal side in the suspension longitudinal direction, wherein the center distal-side extending region functions as both the distal-side extending regions of the paired spring portions.

3. A magnetic head slider locking apparatus according to claim 1, wherein the distal-side extending region of each of the paired spring portions includes an inclined area inclined to the suspension longitudinal direction so as to extend from the fixed portion toward the inner side in the suspension width direction and the distal side in the suspension longitudinal direction, and a longitudinal direction extending area that extends from a distal end of the inclined area toward the distal side along the suspension longitudinal direction.

4. A magnetic head slider locking apparatus according to claim 1,
wherein there is provided a base plate fixed to a surface of the head mount region that faces the disk surface,
wherein the fixed portion includes paired right and left longitudinal direction regions that are positioned on the outer side in the suspension width direction farther than the distal-side engagement region and extend in the suspension longitudinal direction, and
wherein the paired longitudinal direction regions are fixed to a surface of the base plate that faces the disk surface so that the fixed portion is fixed to the flexure substrate.

5. A magnetic head slider locking apparatus according to claim 4,
wherein the paired arm regions and the connecting region form a U-shaped portion into which a movable jig for applying the external operation force can be inserted,
wherein the fixed portion is provided with paired right and left extending regions, each of which is positioned within a space surrounded by the corresponding distal-side extending region and the corresponding biasing region and extends toward the distal side from the corresponding longitudinal direction region, and
wherein each of the extending regions is provided with a fixed jig engagement portion with which a fixed jig for maintaining the fixed portion at a fixed position against the external operation force by the movable jig can be engaged, the fixed jig engagement portion being positioned so as not to be overlapped with both load beam part and the flexure part.

6. A magnetic head slider locking apparatus according to claim 4,
wherein the base plate includes a center region fixed to the head mount region and paired right and left side regions extending from the center region toward both sides in the suspension width direction, there being provided a step between each of the side regions and the center region so that there is provided a space in a direction orthogonal to the disk surface between each of the side regions and the flexure substrate in a state where the center region is fixed to the head mount region, and
wherein the paired longitudinal direction regions are fixed to surfaces of the paired side regions that face the disk surface.

7. A magnetic head slider locking apparatus according to claim 1,
wherein the flexure part includes a wiring structure that has an insulating layer laminated on the flexure substrate, and a slider conductive layer having a proximal end capable of being electrically connected to an outside and laminated on the insulating layer,
wherein the distal-side engagement region is provided with a slider electrical connection structure, and
wherein the slider electrical connection structure includes an insulating layer that is provided to the distal-side engagement region, and a slider conductive member that is provided to the insulating layer so that a distal end of the slider conductive layer is electrically connected to the magnetic head slider by way of the slider conductive member.

* * * * *